(12) United States Patent
Xiao et al.

(10) Patent No.: US 11,879,660 B2
(45) Date of Patent: Jan. 23, 2024

(54) PHOTOVOLTAIC AIR CONDITIONER CONTROL METHOD AND APPARATUS AND PHOTOVOLTAIC AIR CONDITIONER

(71) Applicant: Gree Electric Appliances, Inc. of Zhuhai, Guangdong (CN)

(72) Inventors: Zunhui Xiao, Guangdong (CN); Dongrui Qu, Guangdong (CN); Xianqiao Yu, Guangdong (CN); Ningning Chen, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 162 days.

(21) Appl. No.: 17/621,872

(22) PCT Filed: Jul. 7, 2020

(86) PCT No.: PCT/CN2020/100562
§ 371 (c)(1),
(2) Date: Dec. 22, 2021

(87) PCT Pub. No.: WO2021/036516
PCT Pub. Date: Mar. 4, 2021

(65) Prior Publication Data
US 2022/0243949 A1     Aug. 4, 2022

(30) Foreign Application Priority Data

Aug. 30, 2019  (CN) .......................... 201910818100.8

(51) Int. Cl.
*F24F 11/86* (2018.01)
*F24F 11/64* (2018.01)
*F24F 5/00* (2006.01)

(52) U.S. Cl.
CPC .............. *F24F 11/86* (2018.01); *F24F 11/64* (2018.01); *F24F 2005/0067* (2013.01)

(58) Field of Classification Search
CPC ..... F24F 11/86; F24F 11/64; F24F 2005/0067
See application file for complete search history.

(56) References Cited

U.S. PATENT DOCUMENTS

| 5,560,218 A | 10/1996 | Jang | |
|---|---|---|---|
| 2012/0049629 A1* | 3/2012 | Miller | ..................... H02J 3/381 307/64 |
| 2016/0231010 A1 | 8/2016 | Zhao et al. | |

(Continued)

FOREIGN PATENT DOCUMENTS

| CN | 103486682 A | 1/2014 |
|---|---|---|
| CN | 104135027 A | 11/2014 |

(Continued)

*Primary Examiner* — Nelson J Nieves
(74) *Attorney, Agent, or Firm* — The Webb Law Firm (57) ABSTRACT

A photovoltaic air conditioner control method and apparatus and a photovoltaic air conditioner. The method includes: detecting in real time the grid-connected side inverter module temperature and the grid-connected side current of a photovoltaic air conditioner; determining the interval in which the grid-connected inverter module temperature is located and the interval in which the grid-connected side current is located; and, on the basis of the determining results, performing frequency-limiting and frequency-reduction control of the photovoltaic air conditioner.

17 Claims, 4 Drawing Sheets

(56) References Cited

U.S. PATENT DOCUMENTS

| | | | | |
|---|---|---|---|---|
| 2017/0314802 A1* | 11/2017 | Zhang | ............. | F24F 11/77 |
| 2018/0198284 A1* | 7/2018 | Yasui | ............. | H02J 3/381 |
| 2018/0274810 A1* | 9/2018 | Woods | ............. | F24F 11/79 |
| 2018/0347834 A1* | 12/2018 | Dong | ............. | F24F 5/0046 |

FOREIGN PATENT DOCUMENTS

| | | |
|---|---|---|
| CN | 104566730 A | 4/2015 |
| CN | 205370032 U | 7/2016 |
| CN | 106168402 A | 11/2016 |
| CN | 107388661 A | 11/2017 |
| CN | 107528293 A | 12/2017 |
| CN | 108019895 A | 5/2018 |
| CN | 109163430 A | 1/2019 |
| CN | 110567139 A | 12/2019 |
| EP | 3051217 A1 | 8/2016 |
| JP | 2017156018 A | 9/2017 |

\* cited by examiner

FIG. 6

PHOTOVOLTAIC AIR CONDITIONER CONTROL METHOD AND APPARATUS AND PHOTOVOLTAIC AIR CONDITIONER

CROSS-REFERENCE TO RELATED APPLICATIONS

This application is the United States national phase of International Application No. PCT/CN2020/100562 filed Jul. 7, 2020, and claims priority to CN 201910818100.8, filed on Aug. 30, 2019, the disclosures of which are hereby incorporated by reference in their entirety.

TECHNICAL FIELD

The present disclosure relates to the technical field of air conditioner, in particular to a photovoltaic air conditioner control method, apparatus and photovoltaic air conditioner.

BACKGROUND

The air conditioner industry consumes huge electricity every year. Solar energy, as a green energy, causes the appearance of "no power consumption" photovoltaic air conditioner, which is impacting the traditional air conditioner industry. In short, a photovoltaic air conditioner is a combination of an inverter and an air conditioner, wherein power matching is necessary for their cooperative operation. When the power generation at the photovoltaic side of the photovoltaic air conditioner exceeds the tolerance range of the air conditioner and cannot be connected to the grid, the power generated on the photovoltaic side shall be limited and the operation frequency of the air conditioner compressor shall be reduced to enable the whole apparatus to operate normally. Generally, when controlling an air conditioner, it is mainly to detect the power of the air conditioner to ensure the stable operation of the air conditioner, and under the condition of high energy efficiency, prevent the components from be damaged due to high temperature, so as to make the apparatus operate reliably.

The inventors known a traditional air conditioner control method, which controls the power of the compressor by detecting the input voltage and current of the urban power grid, specifically, to limit or reduce the frequency of the air conditioner.

SUMMARY

According to some embodiments of the present disclosure, there is provided a photovoltaic air conditioner control method, comprising:
  detecting grid-side inverter module temperature and grid-side current of a photovoltaic air conditioner in real time;
  determining an interval in which the grid-side inverter module temperature is located and an interval in which the grid-side current is located; and
  performing frequency limitation and frequency reduction control on the photovoltaic air conditioner according to a determination result.
In some embodiments, performing frequency limitation and frequency reduction control on the photovoltaic air conditioner according to a determination result comprises:
  controlling a compressor of the photovoltaic air conditioner to continue to operate according to a current operating state if the grid-side inverter module temperature is less than or equal to a first temperature threshold and the grid-side current is less than or equal to a first current threshold;
  controlling the compressor of the photovoltaic air conditioner to operate stably at a current frequency if the grid-side inverter module temperature and the grid-side current continue to rise, when the grid-side inverter module temperature is greater than or equal to a second temperature threshold and less than a fourth temperature threshold, or the grid-side current is greater than or equal to a second current threshold and less than a fourth current threshold; and
  controlling the compressor of the photovoltaic air conditioner to reduce its frequency if the grid-side inverter module temperature and the grid-side current continue to rise, when the grid-side inverter module temperature is greater than or equal to the fourth temperature threshold, or the grid-side current is greater than or equal to the fourth current threshold.

In some embodiments, performing frequency limitation and frequency reduction control on the photovoltaic air conditioner according to a determination result further comprises:
  controlling the compressor of the photovoltaic air conditioner to exit frequency reduction operation after controlling the compressor of the photovoltaic air conditioner to reduce its frequency, if the grid-side inverter module temperature is less than or equal to a third temperature threshold and the grid-side current is less than or equal to a third current threshold;
  controlling the compressor of the photovoltaic air conditioner to operate stably at a current frequency if the grid-side inverter module temperature is greater than or equal to the second temperature threshold and less than the third temperature threshold, or the grid-side current is greater than or equal to the second current threshold and less than the third current threshold; and
  controlling the compressor of the photovoltaic air conditioner to exit frequency limitation operation if the grid-side inverter module temperature is less than or equal to the first temperature threshold and the grid-side current is less than or equal to the first current threshold,
wherein: the first temperature threshold, the second temperature threshold, the third temperature threshold and the fourth temperature threshold increase sequentially, and the first current threshold, the second current threshold, the third current threshold and the fourth current threshold increase sequentially.

In some embodiments, performing frequency limitation and frequency reduction control on the photovoltaic air conditioner according to a determination result comprises:
  setting or resetting preset flag bits according to the determination result, wherein the preset flag bits comprise a frequency limitation flag bit and a frequency reduction flag bit; and
  performing frequency limitation and frequency reduction control on the photovoltaic air conditioner according to strategies corresponding to the processed preset flag bits.

In some embodiments, setting or resetting preset flag bits according to the determination result comprises:
  resetting the frequency limitation flag bit and the frequency reduction flag bit if the grid-side inverter module temperature is less than or equal to a first temperature threshold and the grid-side current is less than or equal to a first current threshold; setting the frequency limitation flag bit if the grid-side inverter module temperature and the grid-side current continue to rise, when the grid-side inverter module temperature is greater than or equal to a second temperature threshold and less than a fourth temperature threshold, or the grid-side current is greater than or equal to a second current threshold and less than a fourth current threshold; and setting the frequency reduction flag bit if the grid-side inverter module temperature and the grid-side current continue to rise, when the grid-side inverter module temperature is greater than or equal to the fourth temperature threshold, or the grid-side current is greater than or equal to the fourth current threshold.

In some embodiments, setting or resetting preset flag bits according to the determination result further comprises: resetting the frequency reduction flag bit after setting the frequency reduction flag bit, if the grid-side inverter module temperature is less than or equal to a third temperature threshold and the grid-side current is less than or equal to a third current threshold;

setting the frequency limitation flag bit if the grid-side inverter module temperature is greater than or equal to the second temperature threshold and less than the third temperature threshold, or the grid-side current is greater than or equal to the second current threshold and less than the third current threshold; and resetting the frequency limitation flag bit if the grid-side inverter module temperature is less than or equal to the first temperature threshold and the grid-side current is less than or equal to the first current threshold.

In some embodiments, setting a flag bit indicates "enabled" and resetting a flag bit indicates "disabled".

In some embodiments, a strategy corresponding to setting the frequency limitation flag bit is to perform frequency limitation operation on the photovoltaic air conditioner; a strategy corresponding to resetting the frequency limitation flag is not to limit the frequency of the photovoltaic air conditioner or exit frequency limitation operation, and not to limit photovoltaic power generation; a strategy corresponding to setting the frequency reduction flag bit is to perform frequency reduction operation on the photovoltaic air conditioner; and a strategy corresponding to resetting the frequency reduction flag bit is not to perform frequency reduction operation on the photovoltaic air conditioner, or exit frequency reduction operation.

According to some embodiments of the present disclosure, there is further provided a photovoltaic air conditioner control apparatus, comprising:

a detection module configured to detect grid-side inverter module temperature and grid-side current of a photovoltaic air conditioner in real time;

a determination module configured to determine an interval in which the grid-side inverter module temperature is located and an interval in which the grid-side current is located; and a control module configured to perform frequency limitation and frequency reduction control on the photovoltaic air conditioner according to a determination result.

According to some embodiments of the present disclosure, there is further provided a photovoltaic air conditioner control apparatus, comprising: a memory; a processor coupled to the memory, the processor configured to, based on instructions stored in the memory, carry out the photovoltaic air conditioner control method according to any embodiment of the present disclosure.

According to some embodiments of the present disclosure, there is further provided a photovoltaic air conditioner, comprising: the photovoltaic air conditioner control apparatus according to any embodiment of the present disclosure.

According to some embodiments of the present disclosure, there is further provided a non-transitory computer-readable storage medium on which a computer program is stored, wherein the computer program implements the photovoltaic air conditioner control method according to any embodiment of the present disclosure when the computer program is executed by a processor.

DETAILED DESCRIPTION

In order to make objectives, technical schemes and advantages of the present disclosure more clear, the present disclosure will be further described in detail with reference to the accompanying drawings. Obviously, merely some embodiments of this disclosure, rather than all embodiments thereof, are given herein. All other embodiments obtained by those of ordinary skill in the art based on the embodiments of the present disclosure without creative efforts shall fall within the protection scope of the present disclosure.

It should be noted that the terms "first", "second" and the like in the description and claims of the present disclosure and the drawings are used to distinguish similar objects, and are not necessarily used to describe a specific order or sequence. It should be understood that the terms so used may be interchanged where appropriate so that the embodiments of the disclosure described herein can be implemented in an order other than those illustrated or described herein. The steps shown in the flowchart can be performed in a computer system that executes a set of computer-executable instructions. Although a logical sequence is shown in the flowchart, in some cases, the steps shown or described may be performed in an order different from that shown herein.

The inventors realized that the control method for traditional air conditioners known by the inventors is not applicable to photovoltaic air conditioners. If the operating frequency of the compressor of a photovoltaic air conditioner is too high, the equipment will be damaged, and the repeated frequency limitation and reduction of the compressor will also affect the heating or cooling effect of the photovoltaic air conditioner. At present, no effective solution for the frequency limitation and reduction control of the photovoltaic air conditioners has been proposed.

In view of this, some embodiments of the present disclosure provide a photovoltaic air conditioner control method, apparatus and photovoltaic air conditioner to solve the problem of frequency limitation and reduction control of photovoltaic air conditioners.

Figure 1:
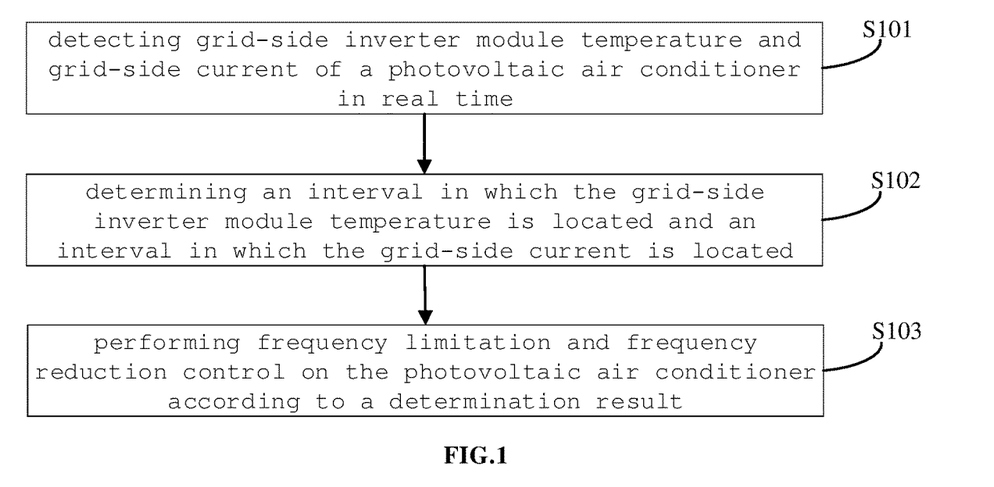
FIG. 1 is a flowchart showing a photovoltaic air conditioner control method according to some embodiments of the present disclosure.

FIG. 1 is a flowchart showing a photovoltaic air conditioner control method according to some embodiments of the present disclosure.

As shown in FIG. 1, the method includes the following steps.

S101: detecting grid-side inverter module temperature and grid-side current of a photovoltaic air conditioner in real time.

After a photovoltaic air conditioner starts to operate, it detects grid-side inverter module temperature and grid-side current in real time as the basis for the frequency limitation and reduction control of the photovoltaic air conditioner.

S102: determining an interval in which the grid-side inverter module temperature is located and an interval in which the grid-side current is located.

S103: performing frequency limitation and frequency reduction control on the photovoltaic air conditioner according to a determination result.

In some embodiments, corresponding temperature and current thresholds are set in advance according to actual situations to determine an interval in which the grid-side inverter module temperature is located and an interval in which the grid-side current is located. Different intervals that are satisfied corresponds to different specific controls. For example, the frequency of the compressor is limited in interval 1, frequency limitation is exited in interval 2.

In the technical solution of this embodiment, grid-side inverter module temperature and grid-side current of the photovoltaic air conditioner are detected in real time. According to the interval in which the grid-side inverter module temperature is located and the interval in which the grid-side current is located, frequency limitation and reduction control of the photovoltaic air conditioner is carried out without detecting the operating frequency of the compressor, thereby realizing rapid frequency limitation and reduction, preventing equipment damage due to the continuous increase of the compressor's operating frequency in the case of a larger generated power on the photovoltaic side, and avoiding repeated frequency limitation and reduction of the compressor, which may affect the heating or cooling effect of the photovoltaic air conditioner.

It should be noted that the determination of the interval in which the grid-side inverter module temperature is located and the determination of the interval in which the grid-side current is located in S102 are not distinguished in sequence. In some embodiments, the interval in which the grid-side inverter module temperature is located is determined first. In other embodiments, the interval in which the grid-side current is located is determined first. In still other embodiments, the interval in which the grid-side inverter module temperature is located and the interval in which the grid-side current is located are determined at the same time.

In some embodiments, performing frequency limitation and frequency reduction control on the photovoltaic air conditioner according to a determination result in S103 comprises:

if the grid-side inverter module temperature is less than or equal to a first temperature threshold and the grid-side current is less than or equal to a first current threshold, controlling a compressor of the photovoltaic air conditioner to continue to operate according to a current operating state, that is, the compressor operates freely without frequency limitation and frequency reduction processing;

if the grid-side inverter module temperature and the grid-side current continue to rise, when the grid-side inverter module temperature is greater than or equal to a second temperature threshold and less than a fourth temperature threshold, or the grid-side current is greater than or equal to a second current threshold and less than a fourth current threshold, controlling the compressor of the photovoltaic air conditioner to operate stably at a current frequency, that is, limiting the frequency of the compressor;

if the grid-side inverter module temperature and the grid-side current continue to rise, when the grid-side inverter module temperature is greater than or equal to the fourth temperature threshold, or the grid-side current is greater than or equal to the fourth current threshold, controlling the compressor of the photovoltaic air conditioner to reduce its frequency, that is, reducing the frequency of the compressor.

The above process is a real-time detection and control process after the photovoltaic air conditioner starts to operate. The frequency limitation and frequency reduction conditions are not met initially, and the compressor can operate normally (i.e. operate freely), without limiting the power generated on the photovoltaic side, thereby increasing the power generation efficiency. When the frequency limitation condition is met, the frequency of the compressor is limited. If the frequency limitation does not work, the frequency of the compressor is reduced when the frequency reduction condition is met. This can prevent equipment damage due to the continuous increase in operating frequency of the compressor in the case of a larger power generated on the photovoltaic side, while avoiding repeated frequency limitation and frequency reduction of the compressor, which otherwise may affect the heating or cooling effect of the photovoltaic air conditioner.

In some embodiments, performing frequency limitation and frequency reduction control on the photovoltaic air conditioner according to a determination result in S103 further comprises: after controlling the compressor of the photovoltaic air conditioner to reduce its frequency, if the grid-side inverter module temperature is less than or equal to a third temperature threshold and the grid-side current is less than or equal to a third current threshold, controlling the compressor of the photovoltaic air conditioner to exit frequency reduction operation, that is, the compressor operates freely in this case, without frequency limitation and frequency reduction processing; if the grid-side inverter module temperature is greater than or equal to the second temperature threshold and less than the third temperature threshold, or the grid-side current is greater than or equal to the second current threshold and less than the third current threshold, controlling the compressor of the photovoltaic air conditioner to operate stably at a current frequency, that is, limiting the frequency of the compressor;

if the grid-side inverter module temperature is less than or equal to the first temperature threshold and the grid-side current is less than or equal to the first current threshold, controlling a compressor of the photovoltaic air conditioner to exit frequency limitation operation, that is, the compressor operates freely in this case, without frequency limitation and frequency reduction processing.

The above process is a real-time detection and control process in the case that the frequency of the compressor gradually decreases after frequency reduction processing of the photovoltaic air conditioner. In the process of frequency reduction, when the condition for exiting frequency reduction is met, the frequency reduction operation is exited, and the compressor operates normally. Further, when the frequency limitation condition is met, the frequency of the compressor is limited. When the condition for exiting frequency limitation is met, the frequency limitation operation is exited. In this case, the compressor operates normally, without limiting the power generated on the photovoltaic side, thereby increasing the power generation efficiency. This can prevent equipment damage due to the continuous increase in operating frequency of the compressor in the case of a larger power generated on the photovoltaic side, while avoiding repeated frequency limitation and frequency reduction of the compressor, which otherwise may affect the heating or cooling effect of the photovoltaic air conditioner.

The first temperature threshold, the second temperature threshold, the third temperature threshold and the fourth temperature threshold increase sequentially, and the first current threshold, the second current threshold, the third current threshold and the fourth current threshold increase sequentially.

In some embodiments, performing frequency limitation and frequency reduction control on the photovoltaic air conditioner according to a determination result in S103 comprises: setting or resetting preset flag bits according to the determination result, wherein the preset flag bits include a frequency limitation flag bit and a frequency reduction flag bit; according to strategies corresponding to the processed preset flag bits, performing frequency limitation and frequency reduction control on the photovoltaic air conditioner.

In some embodiments, each flag bit is set or reset, wherein setting a flag bit indicates "enabled" and resetting a flag bit indicates "disabled". For example, a strategy corresponding to setting the frequency limitation flag bit is to perform frequency limitation operation on the photovoltaic air conditioner; a strategy corresponding to resetting the frequency limitation flag is not to limit the frequency of the photovoltaic air conditioner or exit frequency limitation operation, and not to limit photovoltaic power generation; a strategy corresponding to setting the frequency reduction flag bit is to perform frequency reduction operation on the photovoltaic air conditioner; a strategy corresponding to resetting the frequency reduction flag bit is not to perform frequency reduction operation on the photovoltaic air conditioner, or exit frequency reduction operation. In some embodiments, both the frequency limitation flag bit and the frequency reduction flag bit are initially reset as default.

A frequency limitation flag bit and a frequency reduction flag bit are introduced in this embodiment. According to the result of the determination of an interval in which the grid-side inverter module temperature is located and the interval in which the grid-side current is located, the frequency limit flag bit and the frequency reduction flag bit are set or reset respectively, and then operations corresponding to the frequency limit flag bit and the frequency reduction flag bit are performed. There is no need to calculate a real-time power to compare with a power threshold. The operation is flexible and simple to realize, and has fast execution speed.

In some embodiments, setting or resetting preset flag bits according to the determination result comprises:
if the grid-side inverter module temperature is less than or equal to the first temperature threshold and the grid-side current is less than or equal to the first current threshold, resetting the frequency limitation flag bit and the frequency reduction flag bit;
if the grid-side inverter module temperature and the grid-side current continue to rise, when the grid-side inverter module temperature is greater than or equal to the second temperature threshold and less than the fourth temperature threshold, or the grid-side current is greater than or equal to the second current threshold and less than the fourth current threshold, setting the frequency limitation flag bit;
if the grid-side inverter module temperature and the grid-side current continue to rise, when the grid-side inverter module temperature is greater than or equal to the fourth temperature threshold, or the grid-side current is greater than or equal to the fourth current threshold, setting the frequency reduction flag bit.

The above process is a real-time detection and control process after the photovoltaic air conditioner starts to operate. The frequency limitation and frequency reduction conditions are not met initially, and the frequency limitation flag bit and the frequency reduction flag bit are both reset, that is, the compressor operates normally, without limiting the power generated on the photovoltaic side, thereby increasing the power generation efficiency. When the frequency limitation condition is met, the frequency limitation flag bit is set, that is, the frequency of the compressor is limited. If the frequency limitation does not work, when the frequency reduction condition is met, the frequency reduction flag bit is set, that is, the frequency of the compressor is reduced. This can prevent equipment damage due to the continuous increase in operating frequency of the compressor in the case of a larger power generated on the photovoltaic side, while avoiding repeated frequency limitation and frequency reduction of the compressor, which otherwise may affect the heating or cooling effect of the photovoltaic air conditioner.

In some embodiments, setting or resetting preset flag bits according to the determination result further comprises: after setting the frequency reduction flag bit, if the grid-side inverter module temperature is less than or equal to the third temperature threshold and the grid-side current is less than or equal to the third current threshold, resetting the frequency reduction flag bit;
if the grid-side inverter module temperature is greater than or equal to the second temperature threshold and less than the third temperature threshold, or the grid-side current is greater than or equal to the second current threshold and less than the third current threshold, setting the frequency limitation flag bit;
if the grid-side inverter module temperature is less than or equal to the first temperature threshold and the grid-side current is less than or equal to the first current threshold, resetting the frequency limitation flag bit.

The above process is a real-time detection and control process in the case that the frequency of the compressor gradually decreases after frequency reduction processing of the photovoltaic air conditioner. In the process of frequency reduction, when the condition for exiting frequency reduction is met, the frequency reduction flag bit is reset, that is, the frequency reduction operation is exited, and the compressor operates normally. Further, when the frequency limitation condition is met, the frequency limitation flag bit is set, that is, the frequency of the compressor is limited. When the condition for exiting frequency limitation is met, the frequency limitation flag bit is reset, that is, the frequency limitation operation is exited. In this case, the compressor operates normally, without limiting the power generated on the photovoltaic side, thereby increasing the power generation efficiency. This can prevent equipment damage due to the continuous increase in operating frequency of the compressor in the case of a larger power generated on the photovoltaic side, while avoiding repeated frequency limitation and frequency reduction of the compressor, which otherwise may affect the heating or cooling effect of the photovoltaic air conditioner.

Based on the same inventive concept, this embodiment provides a photovoltaic air conditioner control apparatus. In some embodiments, the photovoltaic air conditioner control apparatus is used to realize the photovoltaic air conditioner control method described in the above embodiment. For example, the photovoltaic air conditioner control apparatus is implemented by software and/or hardware. In some embodiments, the photovoltaic air conditioner control apparatus is integrated into a photovoltaic air conditioner.

Figure 2:
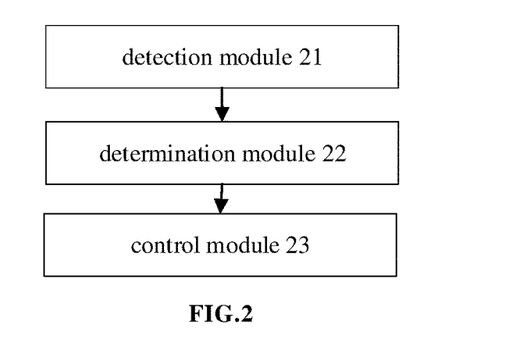
FIG. 2 is a structural block diagram showing a photovoltaic air conditioner control apparatus according to some embodiments of the present disclosure.

FIG. 2 is a structural block diagram showing a photovoltaic air conditioner control apparatus according to some embodiments of the present disclosure.

As shown in FIG. 2, the photovoltaic air conditioner control apparatus comprises:
- a detection module 21 configured to detect grid-side inverter module temperature and grid-side current of a photovoltaic air conditioner in real time;
- a determination module 22 configured to determine an interval in which the grid-side inverter module temperature is located and an interval in which the grid-side current is located;
- a control module 23 configured to perform frequency limitation and frequency reduction control on the photovoltaic air conditioner according to a determination result.

In some embodiments, the control module 23 is configured for:
- if the grid-side inverter module temperature is less than or equal to a first temperature threshold and the grid-side current is less than or equal to a first current threshold, controlling a compressor of the photovoltaic air conditioner to continue to operate according to a current operating state;
- if the grid-side inverter module temperature and the grid-side current continue to rise, when the grid-side inverter module temperature is greater than or equal to a second temperature threshold and less than a fourth temperature threshold, or the grid-side current is greater than or equal to a second current threshold and less than a fourth current threshold, controlling the compressor of the photovoltaic air conditioner to operate stably at a current frequency;
- if the grid-side inverter module temperature and the grid-side current continue to rise, when the grid-side inverter module temperature is greater than or equal to the fourth temperature threshold, or the grid-side current is greater than or equal to the fourth current threshold, controlling the compressor of the photovoltaic air conditioner to reduce its frequency.

In some embodiments, the control module 23 is further configured for:
- after controlling the compressor of the photovoltaic air conditioner to reduce its frequency, if the grid-side inverter module temperature is less than or equal to a third temperature threshold and the grid-side current is less than or equal to a third current threshold, controlling the compressor of the photovoltaic air conditioner to exit frequency reduction operation;
- if the grid-side inverter module temperature is greater than or equal to the second temperature threshold and less than the third temperature threshold, or the grid-side current is greater than or equal to the second current threshold and less than the third current threshold, controlling the compressor of the photovoltaic air conditioner to operate stably at a current frequency;
- if the grid-side inverter module temperature is less than or equal to the first temperature threshold and the grid-side current is less than or equal to the first current threshold, controlling the compressor of the photovoltaic air conditioner to exit frequency limitation operation.

The first temperature threshold, the second temperature threshold, the third temperature threshold and the fourth temperature threshold increase sequentially, and the first current threshold, the second current threshold, the third current threshold and the fourth current threshold increase sequentially.

In some embodiments, the control module 23 comprises:
- a flag bit processing unit configured to set or reset preset flag bits according to the determination result, wherein the preset flag bits include a frequency limitation flag bit and a frequency reduction flag bit;
- a control unit configured to perform frequency limitation and frequency reduction control on the photovoltaic air conditioner according to strategies corresponding to the processed preset flag bits.

Setting a flag bit indicates "enabled" and resetting a flag bit indicates "disabled".

In some embodiments, the flag bit processing unit is configured for:
- if the grid-side inverter module temperature is less than or equal to the first temperature threshold and the grid-side current is less than or equal to the first current threshold, resetting the frequency limitation flag bit and the frequency reduction flag bit;
- if the grid-side inverter module temperature and the grid-side current continue to rise, when the grid-side inverter module temperature is greater than or equal to the second temperature threshold and less than the fourth temperature threshold, or the grid-side current is greater than or equal to the second current threshold and less than the fourth current threshold, setting the frequency limitation flag bit;
- if the grid-side inverter module temperature and the grid-side current continue to rise, when the grid-side inverter module temperature is greater than or equal to the fourth temperature threshold, or the grid-side current is greater than or equal to the fourth current threshold, setting the frequency reduction flag bit.

In some embodiments, the flag bit processing unit is further configured for:
- after setting the frequency reduction flag bit, if the grid-side inverter module temperature is less than or equal to the third temperature threshold and the grid-side current is less than or equal to the third current threshold, resetting the frequency reduction flag bit;
- if the grid-side inverter module temperature is greater than or equal to the second temperature threshold and less than the third temperature threshold, or the grid-side current is greater than or equal to the second current threshold and less than the third current threshold, setting the frequency limitation flag bit;
- if the grid-side inverter module temperature is less than or equal to the first temperature threshold and the grid-side current is less than or equal to the first current threshold, resetting the frequency limitation flag bit.

Based on the same inventive concept, this embodiment provides another photovoltaic air conditioner control apparatus.

Figure 3:
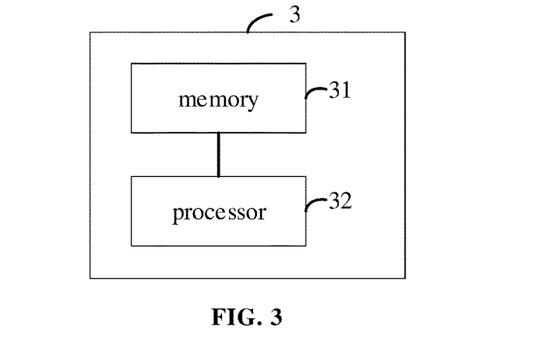
FIG. 3 is a structural block diagram showing a photovoltaic air conditioner control apparatus according to other embodiments of the present disclosure.

FIG. 3 is a structural block diagram showing a photovoltaic air conditioner control apparatus according to other embodiments of the present disclosure.

As shown in FIG. 3, the photovoltaic air conditioner control apparatus 3 includes a memory 31; and a processor 32 coupled to the memory 31. The memory 31 is configured to store instructions for executing a corresponding embodiment of the photovoltaic air conditioner control method. The processor 32 is configured to, based on instructions stored in the memory 31, carry out the photovoltaic air conditioner control method according to any embodiment of the present disclosure.

In some embodiments, the above photovoltaic air conditioner control apparatus executes the photovoltaic air conditioner control method provided by the embodiment of the present disclosure, and has corresponding functional modules for executing the method and achieving beneficial effects. For technical details not described in detail in this embodiment, reference can be made to the photovoltaic air conditioner control method provided in the embodiment of the present disclosure. This embodiment further provides a photovoltaic air conditioner, comprising the photovoltaic air conditioner control apparatus described above.

This embodiment further provides a non-transitory computer-readable storage medium on which a computer program is stored, which when executed by a processor implement the photovoltaic air conditioner control method according to any embodiment of the present disclosure.

On the basis of the above embodiments, this embodiment describes the above photovoltaic air conditioner control scheme in combination with some specific embodiments. The same or corresponding terms as the above embodiments have been explained above, and will not be repeated in this embodiment. It should be noted that the specific embodiment is intended to better explain the present disclosure, but is not a limitation on the disclosure.

The execution sequence of the determination of the interval in which the grid-side inverter module temperature is located and the determination of the interval in which the grid-side current is located is not limited in this embodiment. In some embodiments, the interval in which the grid-side inverter module temperature is located is determined first, and then the interval in which the grid-side current is located is determined. In some embodiments, the interval in which the grid-side current is located is determined first, and then the interval in which the grid-side inverter module temperature is located is determined. In still other embodiments, the interval in which the grid-side inverter module temperature is located and the interval in which the grid-side current is located are determined at the same time. When the photovoltaic air conditioner is just started to operate, the frequency limitation flag bit and the frequency reduction flag bit are both reset.

At the beginning of the operation of the photovoltaic air conditioner, the grid-side inverter module temperature value and the grid-side current value are relatively small. With the operation of the air conditioner, the temperature value and the current value may increase. For example, the intervals are determined one by one according to the processing sequence shown in FIG. 4 and FIG. 5.

Figure 4:
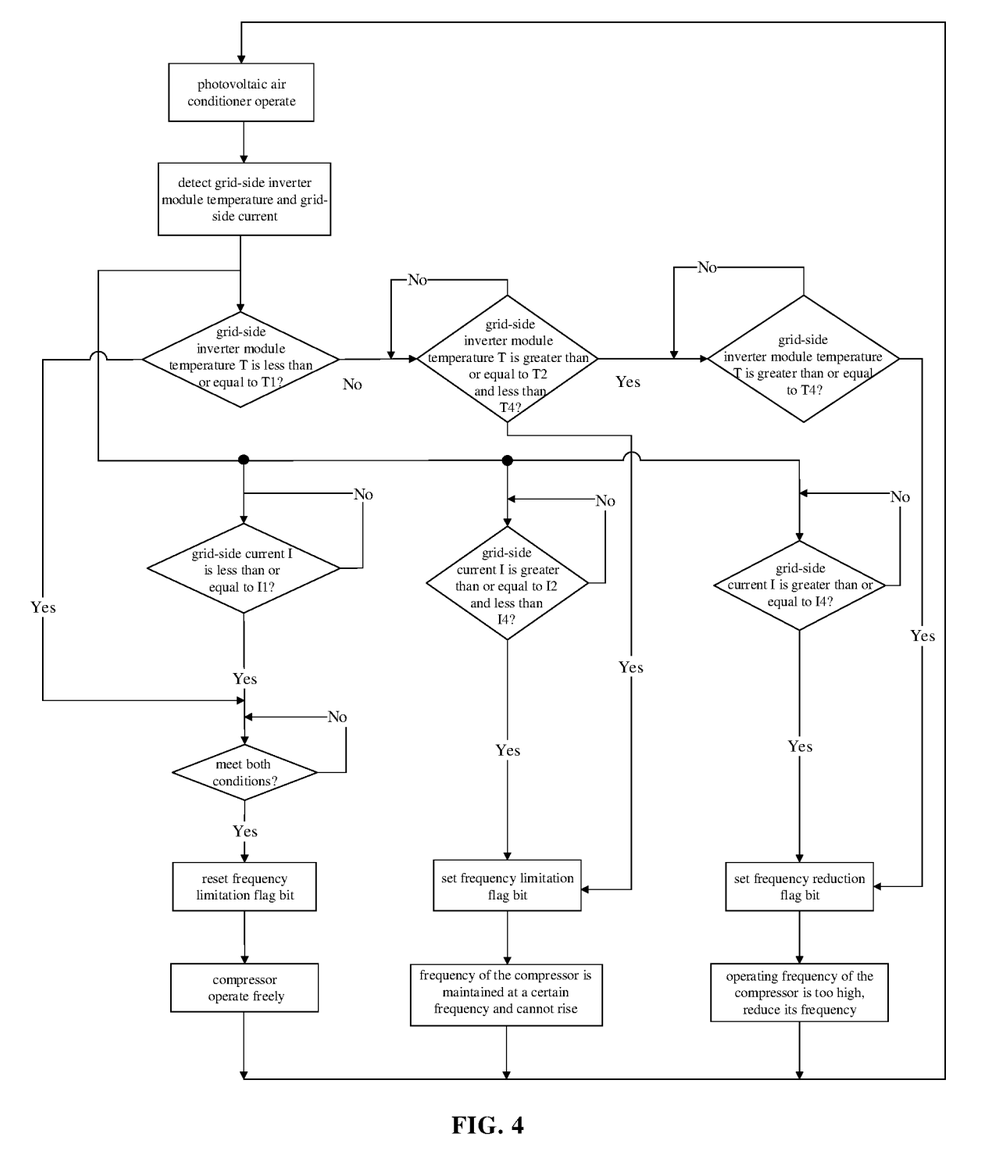
FIG. 4 is a flowchart showing a photovoltaic air conditioner control method according to other embodiments of the present disclosure.

FIG. 4 is a flowchart showing a photovoltaic air conditioner control method according to other embodiments of the present disclosure.

Figure 5:
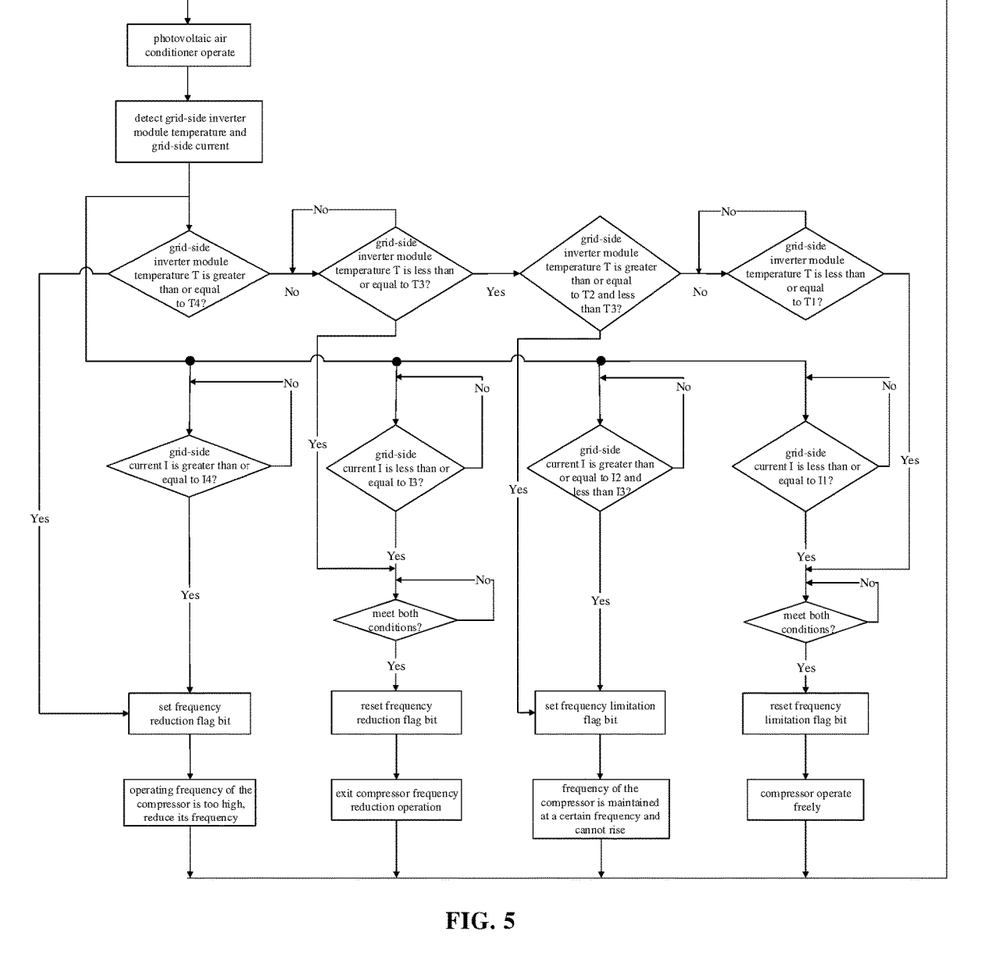
FIG. 5 is a flowchart showing a photovoltaic air conditioner control method according to further embodiments of the present disclosure.

FIG. 5 is a flowchart showing a photovoltaic air conditioner control method according to further embodiments of the present disclosure.

As shown in FIG. 4, the photovoltaic air conditioner operates and detects grid-side inverter module temperature and grid-side current in real time. It is determined whether the current grid-side inverter module temperature T is less than or equal to T1, and whether the current grid-side current I is less than or equal to I1.

If the determination results are both Yes, the frequency limitation flag bit is reset, and the compressor operates freely.

If T>T1, it is further determined whether T is greater than or equal to T2 and less than T4, and/or whether I is greater than or equal to I2 and less than I4.

If either determination result is Yes, the frequency limitation flag bit is set, and the frequency of the compressor is maintained at a certain frequency and cannot rise. In addition, it is further determined whether T is greater than or equal to T4, and/or whether I is greater than or equal to I4. If either determination result is Yes, the frequency reduction flag bit is set, and the operating frequency of the compressor is reduced.

After setting the frequency reduction flag bit and reducing the operating frequency of the compressor, referring to FIG. 5, it is determined whether the current grid-side inverter module temperature T is less than or equal to T3, and whether the current grid-side current I is less than or equal to I3.

If the determination results are both Yes, the frequency reduction flag bit is reset to release the compressor from the state of decreasing frequency and control the compressor to exit frequency reduction operation.

Then, it is further determined whether T is greater than or equal to T2 and less than T3, and/or whether I is greater than or equal to I2 and less than I3.

If either determination result is Yes, the frequency limitation flag bit is set, and the frequency of the compressor is maintained at a certain frequency and cannot rise.

If T is not in the interval greater than or equal to T2 and less than T3, it is further determined whether T is less than or equal to T1 and whether I is less than or equal to I1. If the determination results are both Yes, the frequency limitation flag bit is reset, and the compressor operates freely.

$$T1<T2<T3<T4; I1<I2<I3<I4.$$

In short, four different temperature thresholds are set for the grid-side inverter module temperature, and four different current thresholds are set for the grid-side current. Based on these thresholds, the setting and resetting conditions of the frequency limitation flag bit and the frequency reduction flag bit are as follows:

condition of resetting the frequency limitation flag bit: grid-side inverter module temperature T is less than T1, and the current grid-side current I is less than I1;

condition of setting the frequency limitation flag bit: grid-side inverter module temperature T is greater than or equal to T2, or the current grid-side current I is greater than or equal to I2; That is, if the grid-side inverter module temperature or the grid-side current exceeds a certain value, frequency limitation is required; On the basis of meeting the condition of setting the frequency limitation flag bit, as long as the temperature/current does not exceed T4/I4 and the condition of setting the frequency reduction flag bit is not met, the frequency limitation operation will be maintained;

condition of resetting the frequency reduction flag bit:
grid-side inverter module temperature T is less than or equal to T3, and the current grid-side current I is less than or equal to I3;

condition of setting the frequency reduction flag bit:
grid-side inverter module temperature T is greater than or equal to T4, or the current grid-side current I is greater than or equal to I4;

that is, if the grid-side inverter module temperature or the grid-side current exceeds a certain value, frequency reduction is required.

It should be noted that in this embodiment, the progress of the overall determination step is controlled based on the grid-side inverter module temperature. In other embodiments, the progress of the overall determination step is controlled based on the grid-side current. In other embodiments, the grid side inverter module temperature and the grid side current are treated separately, and are used to control the process of their determination steps respectively. That is, the progress of the step of determining the temperature parameter is controlled based on the grid-side inverter module temperature, and the process of the step of determining the current parameter is controlled based on the grid-side current.

For example, the corresponding text "if T>T1, it is further determined whether T is greater than or equal to T2 and less than T4, and/or further determine whether I is greater than or equal to I2 and less than I4" in FIG. 4 can be replaced with "if I>I1, it is further determined whether T is greater than or equal to T2 and less than T4, and/or further determine whether I is greater than or equal to I2 and less than I4".

Figure 6:
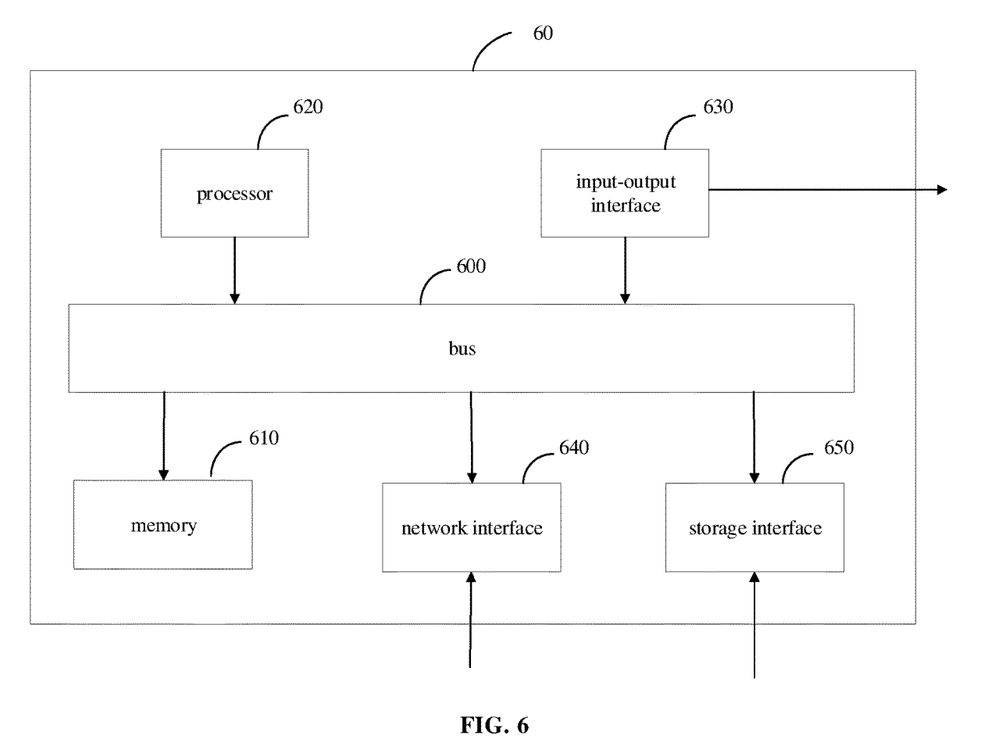
FIG. 6 is a block diagram illustrating a computer system for implementing some embodiments of the present disclosure.

FIG. 6 is a block diagram illustrating a computer system for implementing some embodiments of the present disclosure.

As shown in FIG. 6, the computer system 60 can be represented in the form of a general-purpose computing apparatus. The computer system 60 includes a memory 610, a processor 620, and a bus 600 connecting different system components.

The memory 610 includes, for example, a system memory, a non-volatile storage medium, and the like. The system memory stores, for example, an operating system, application programs, a boot loader (Boot Loader), and other programs. The system memory includes a volatile storage medium such as random access memory (RAM) and/or cache memory. The non-volatile storage medium stores, for example, instructions for executing corresponding embodiments of at least one of the photovoltaic air conditioner control methods. The non-volatile storage medium includes, but not limited to, magnetic disk storage, optical storage, flash memory, and the like.

The processor 620 may be implemented by discrete hardware components such as a general-purpose processor, a digital signal processor (DSP), an application specific integrated circuit (ASIC), a field programmable gate array (FPGA), or other programmable logic apparatuses, discrete gates, or transistors. Accordingly, each module such as the judgment module and the determination module may be implemented by a central processing unit (CPU) running instructions that execute the corresponding steps, or may be implemented by a dedicated circuit that executes the corresponding steps.

The bus 600 may has any of a variety of bus structures. For example, these structures include, but are not limited to, an Industry Standard Architecture (ISA) bus, a Micro Channel Architecture (MAC) bus, and peripheral component interconnects (PCI) bus.

The computer system 60 may further include an input-output interface 630, a network interface 640, a storage interface 650, and the like. These interfaces 630, 640, 650 and the memory 610 and the processor 620 may be connected through a bus 600, for example. The input/output interface 630 provides a connection interface for input/output apparatuses such as a display, a mouse, and a keyboard. The network interface 640 provides a connection interface for various networked apparatuses. The storage interface 650 provides a connection interface for external storage apparatuses such as a floppy disk, a flash disk, or an SD card.

Herein, various aspects of the present disclosure are described with reference to flowcharts and/or block diagrams of methods, apparatuses and computer program products according to embodiments of the present disclosure. It should be understood that each block of the flowcharts and/or block diagrams and any combination of the blocks can be implemented by computer-readable program instructions.

These computer program instructions may be provided to a processor of a general purpose computer, a special purpose computer, or other programmable apparatus to generate a machine such that the instructions executed by the processor generate means implementing the functions specified in one or more flows of the flowcharts and/or one or more blocks of the block diagrams.

These computer-readable program instructions may also be stored in a non-transitory computer-readable storage, and cause a computer to operate in a specific manner to produce a manufactured article including instructions to implement the functions specified in one or more flows of the flowcharts and/or one or more blocks of the block diagrams.

The present disclosure can take the form of an entirely hardware embodiment, an entirely software embodiment or an embodiment containing both hardware and software elements.

The apparatus embodiments described above are only schematic, wherein the units described as separate components may or may not be physically separated, and the component illustrated as a unit may or may not be a physical unit, may be located in one place, or may be distributed on multiple network units. For example, some or all of the modules may be selected according to actual needs to achieve the purpose of the present embodiment.

Through the description of the above embodiments, those skilled in the art may clearly understand that each embodiment can be implemented by means of software and a necessary general hardware platform, or by hardware. Based on this understanding, the above technical solution of the present disclosure essentially or in other word, a portion thereof that contributes to the related technology or all or part of the technical solution can be embodied in the form of a software product, which is stored in a storage medium, such as a ROM/RAM, a magnetic disk, and an optical disk, comprising instructions to cause a computer apparatus (which may be a personal computer, a server, or a network apparatus, etc.) to perform all or part of the steps of the method described in the various embodiments of the present disclosure.

It shall be noted that: the above embodiments are merely illustration of the technical solution of this disclosure, but are not limitation thereof. Although this disclosure has been described in detail with reference to the above embodiment, those ordinary skilled in the art shall understand: the technical solutions recited in the various embodiments described above may be modified or some technical features thereof may be substituted equivalently, such modifications or substitutions do not deviate the nature of the technique from the spirit and scope of the technique embodied in the embodiments according to this disclosure.

What is claimed is:

1. A photovoltaic air conditioner control method, comprising:
   detecting grid-side inverter module temperate and grid-side current of a photovoltaic air conditioner in real time;
   determining an interval in which the grid-side inverter module temperature is located and an interval in which the grid-side current is located; and
   performing frequency limitation and frequency reduction control on the photovoltaic air conditioner according to a determination result comprising:
      controlling a compressor of the photovoltaic air conditioner to continue to operate according to a current operating state if the grid-side inverter module temperature is less than or equal to a first temperature threshold and the grid-side current is less than or equal to a first current threshold;
      controlling the compressor of the photovoltaic air conditioner to operate stably at a current frequency if the grid-side inverter module temperature and the grid-side current continue to rise, when the grid-side inverter module temperature is greater than or equal to a second temperature threshold and less than a third temperature threshold, or the grid-side current is greater than or equal to a second current threshold and less than a third current threshold; and
      controlling the compressor of the photovoltaic air conditioner to reduce its frequency if the grid-side inverter module temperature and the grid-side current continue to rise, when the grid-side inverter module temperature is greater than or equal to the third temperature threshold, or the grid-side current is greater than or equal to the third current threshold.

2. The photovoltaic air conditioner control method according to claim/wherein performing frequency limitation and frequency reduction control on the photovoltaic air conditioner according to the determination result further comprises:
   controlling the compressor of the photovoltaic air conditioner to exit frequency reduction operation after controlling the compressor of the photovoltaic air conditioner to reduce its frequency, if the grid-side inverter module temperature is less than or equal to a fourth temperature threshold and the grid-side current is less than or equal to a fourth current threshold;
   controlling the compressor of the photovoltaic air conditioner to operate stably at a current frequency if the grid-side inverter module temperature is greater than or equal to the second temperature threshold and less than the fourth temperature threshold, or the grid-side current is greater than or equal to the second current threshold and less than the fourth current threshold; and
   controlling the compressor of the photovoltaic air conditioner to exit frequency limitation operation if the grid-side inverter module temperature is less than or equal to the first temperature threshold and the grid-side current is less than or equal to the first current threshold, wherein:
   the first temperature threshold, the second temperature threshold, the fourth temperature threshold and the third temperature threshold increase sequentially, and the first current threshold, the second current threshold, the fourth current threshold and the third current threshold increase sequentially.

3. A photovoltaic air conditioner control method comprising:
   detecting grid-side inverter module temperate and grid-side current of a photovoltaic air conditioner in real time;
   determining an interval in which the grid-side inverter module temperature is located and an interval in which the grid-side current is located; and
   performing frequency limitation and frequency reduction control on the photovoltaic air conditioner according to a determination result, comprising:
      setting or resetting preset flag bits according to the determination result, wherein the preset flag bits comprise a frequency limitation flag bit and a frequency reduction flag bit; and
      performing frequency limitation and frequency reduction control on the photovoltaic air conditioner according to strategies corresponding to the processed preset flag bits.

4. The photovoltaic air conditioner control method according to claim 3, wherein setting or resetting preset flag bits according to the determination result comprises:
   resetting the frequency limitation flag bit and the frequency reduction flag bit if the grid-side inverter module temperature is less than or equal to a first temperature threshold and the grid-side current is less than or equal to a first current threshold;
   setting the frequency limitation flag bit if the grid-side inverter module temperature and the grid-side current continue to rise, when the grid-side inverter module temperature is greater than or equal to a second temperature threshold and less than a third temperature threshold, or the grid-side current is greater than or equal to a second current threshold and less than a third current threshold; and
   setting the frequency reduction flag bit if the grid-side inverter module temperature and the grid-side current continue to rise, when the grid-side inverter module temperature is greater than or equal to the third temperature threshold, or the grid-side current is greater than or equal to the third current threshold.

5. The photovoltaic air conditioner control method according to claim 4, wherein setting or resetting preset flag bits according to the determination result further comprises:
   resetting the frequency reduction flag bit after setting the frequency reduction flag bit, if the grid-side inverter module temperature is less than or equal to a fourth temperature threshold and the grid-side current is less than or equal to a fourth current threshold;
   setting the frequency limitation flag bit if the grid-side inverter module temperature is greater than or equal to the second temperature threshold and less than the fourth temperature threshold, or the grid-side current is greater than or equal to the second current threshold and less than the fourth current threshold; and
   resetting the frequency limitation flag bit if the grid-side inverter module temperature is less than or equal to the first temperature threshold and the grid-side current is less than or equal to the first current threshold.

6. The photovoltaic air conditioner control method according to claim 3, wherein: setting a flag bit indicates "enabled" and resetting a flag bit indicates "disabled".

7. The photovoltaic air conditioner control method according to claim 3, wherein:

a strategy corresponding to setting the frequency limitation flag bit is to perform frequency limitation operation on the photovoltaic air conditioner;

a strategy corresponding to resetting the frequency limitation flag is not to limit the frequency of the photovoltaic air conditioner or exit frequency limitation operation, and not to limit photovoltaic power generation;

a strategy corresponding to setting the frequency reduction flag bit is to perform frequency reduction operation on the photovoltaic air conditioner; and a strategy corresponding to resetting the frequency reduction flag bit is not to perform frequency reduction operation on the photovoltaic air conditioner, or exit frequency reduction operation.

8. A photovoltaic air conditioner control apparatus, comprising:

a detection module configured to detect grid-side inverter module temperature and grid-side current of a photovoltaic air conditioner in real time;

a determination module configured to determine an interval in which the grid-side inverter module temperature is located and an interval in which the grid-side current is located; and a control module configured to perform frequency limitation and frequency reduction control on the photovoltaic air conditioner according to a determination result, comprising:

controlling a compressor of the photovoltaic air conditioner to continue to operate according to a current operating state if the grid-side inverter module temperature is less than or equal to a first temperature threshold and the grid-side current is less than or equal to a first current threshold;

controlling the compressor of the photovoltaic air conditioner to operate stably at a current frequency if the grid-side inverter module temperature and the grid-side current continue to rise, when the grid-side inverter module temperature is greater than or equal to a second temperature threshold and less than a third temperature threshold, or the grid-side current is greater than or equal to a second current threshold and less than a third current threshold; and controlling the compressor of the photovoltaic air conditioner to reduce its frequency if the grid-side inverter module temperature and the grid-side current continue to rise, when the grid-side inverter module temperature is greater than or equal to the third temperature threshold, or the grid-side current is greater than or equal to the third current threshold.

9. A photovoltaic air conditioner control apparatus, comprising:

a memory; and a processor coupled to the memory, the processor configured to, based on instructions stored in the memory, carry out the photovoltaic air conditioner control method according to claim 1.

10. A photovoltaic air conditioner, comprising: the photovoltaic air conditioner control apparatus according to claim 9.

11. A photovoltaic air conditioner control apparatus, comprising:

a memory; and a processor coupled to the memory, the processor configured to, based on instructions stored in the memory, carry out the photovoltaic air conditioner control method according to claim 2.

12. A photovoltaic air conditioner control apparatus, comprising:

a memory; and a processor coupled to the memory, the processor configured to, based on instructions stored in the memory, carry out the photovoltaic air conditioner control method according to claim 3.

13. A photovoltaic air conditioner control apparatus, comprising:

a memory; and a processor coupled to the memory, the processor configured to, based on instructions stored in the memory, carry out the photovoltaic air conditioner control method according to claim 7.

14. A non-transitory computer-readable storage medium on which a computer program is stored, wherein the computer program implements the photovoltaic air conditioner control method according to claim 1 when the computer program is executed by a processor.

15. A non-transitory computer-readable storage medium on which a computer program is stored, wherein the computer program implements the photovoltaic air conditioner control method according to claim 2 when the computer program is executed by a processor.

16. A non-transitory computer-readable storage medium on which a computer program is stored, wherein the computer program implements the photovoltaic air conditioner control method according to claim/when the computer program is executed by a processor.

17. A non-transitory computer-readable storage medium on which a computer program is stored, wherein the computer program implements the photovoltaic air conditioner control method according to claim 7 when the computer program is executed by a processor.

* * * * *

UNITED STATES PATENT AND TRADEMARK OFFICE
CERTIFICATE OF CORRECTION

PATENT NO. : 11,879,660 B2
APPLICATION NO. : 17/621872
DATED : January 23, 2024
INVENTOR(S) : Zunhui Xiao et al.

It is certified that error appears in the above-identified patent and that said Letters Patent is hereby corrected as shown below:

In the Claims

Column 15, Line 9, Claim 1, delete "temperate" and insert -- temperature --

Column 15, Line 41, Claim 2, delete "claim/wherein" and insert -- claim 1, wherein --

Column 16, Line 4, Claim 3, delete "method" and insert -- method, --

Column 16, Line 6, Claim 3, delete "temperate" and insert -- temperature --

Column 18, Line 45, Claim 16, delete "claim/when" and insert -- claim 3 when --

Signed and Sealed this
Nineteenth Day of March, 2024

Katherine Kelly Vidal
*Director of the United States Patent and Trademark Office*